US008712693B2

(12) United States Patent
Maao

(10) Patent No.: US 8,712,693 B2
(45) Date of Patent: Apr. 29, 2014

(54) METHOD FOR ENHANCED SUBSURFACE ELECTROMAGNETIC SENSITIVITY

(75) Inventor: Frank Agnar Maao, Trondheim (NO)

(73) Assignee: Electromagnetic Geoservices ASA, Trondheim (NO)

( * ) Notice: Subject to any disclaimer, the term of this patent is extended or adjusted under 35 U.S.C. 154(b) by 388 days.

(21) Appl. No.: 13/122,519

(22) PCT Filed: Sep. 15, 2009

(86) PCT No.: PCT/GB2009/002199
§ 371 (c)(1),
(2), (4) Date: Aug. 24, 2011

(87) PCT Pub. No.: WO2010/038002
PCT Pub. Date: Apr. 8, 2010

(65) Prior Publication Data
US 2011/0301850 A1  Dec. 8, 2011

(30) Foreign Application Priority Data
Oct. 2, 2008  (GB) .................................. 0818075.4

(51) Int. Cl.
*G01V 3/12* (2006.01)
*G01V 3/38* (2006.01)
*G01V 3/08* (2006.01)
*G01V 3/30* (2006.01)

(52) U.S. Cl.
CPC  *G01V 3/083* (2013.01); *G01V 3/30* (2013.01); *G01V 3/12* (2013.01)
USPC .................. 702/11; 324/365; 702/72; 702/75

(58) Field of Classification Search
CPC ........... G01V 3/08; G01V 3/15; G01V 3/088; G01V 3/30; G01V 3/12; G01V 3/083; G01V 11/00
USPC .................. 702/2, 10, 11, 13, 38, 72, 75, 115; 324/32, 332, 334, 337, 365, 323, 3; 703/2, 10; 166/250.01

See application file for complete search history.

(56) References Cited

U.S. PATENT DOCUMENTS 5,642,050 A  6/1997  Shoemaker
6,628,119 B1  9/2003  Eidesmo et al.
(Continued)

FOREIGN PATENT DOCUMENTS

AU  2001230392 B2  8/2001
EP  1108226  3/2000
(Continued)

OTHER PUBLICATIONS

Alumbaugh, David L., "Numerical Analysis of Three-Component Induction Logging in Geothermal Reservoirs," *Geothermal Technologies Program Geoscience University Research Summaries*, pp. 54-59 (Jun. 1, 2002).

(Continued)

*Primary Examiner* — John H Le
(74) *Attorney, Agent, or Firm* — Patterson Thuente Pedersen, P.A.

(57) ABSTRACT

A method for measuring an enhanced electromagnetic field response, especially in a submarine environment, for the purposes of subsurface data acquisition and processing. An electromagnetic field is applied to subterranean strata at two or more different frequencies, a response at each frequency is detected, and the responses at different frequencies are resolved. The differences in the phase and/or amplitude of the responses are analyzed and the nature of the strata is determined. The same method can be used to determine the hydrocarbon content of a reservoir via the use of a borehole.

27 Claims, 8 Drawing Sheets

(56) References Cited

U.S. PATENT DOCUMENTS

| | | |
|---|---|---|
| 6,696,839 B2 | 2/2004 | Ellingsrud et al. |
| 6,717,411 B2 | 4/2004 | Ellingsrud et al. |
| 6,864,684 B2 | 3/2005 | Ellingsrud et al. |
| 6,900,639 B2 | 5/2005 | Ellingsrud et al. |
| 7,026,819 B2 | 4/2006 | Eidesmo et al. |
| 7,038,456 B2 | 5/2006 | Ellingsrud et al. |
| 7,126,338 B2 | 10/2006 | Macgregor et al. |
| 7,145,341 B2 | 12/2006 | Ellingsrud et al. |
| 7,337,064 B2 * | 2/2008 | MacGregor et al. .............. 702/2 |
| 7,362,102 B2 * | 4/2008 | Andreis ....................... 324/365 |
| 7,567,084 B2 | 7/2009 | Eidesmo et al. |
| 7,919,330 B2 | 4/2011 | De Guzman et al. |
| 7,919,965 B2 | 4/2011 | Schaug-Pettersen et al. |
| 8,075,685 B2 | 12/2011 | Ellingsrud et al. |
| 8,188,748 B2 | 5/2012 | Schaug-Pettersen |
| 8,228,066 B2 | 7/2012 | Ellingsrud et al. |
| 2006/0020697 A1 | 1/2006 | Kelso et al. |
| 2006/0217889 A1 | 9/2006 | Burtz et al. |
| 2007/0024489 A1 | 2/2007 | Cerwin |
| 2007/0150201 A1 | 6/2007 | Eidesmo et al. |
| 2009/0134877 A1 | 5/2009 | Schaug-Pettersen |
| 2010/0045295 A1 | 2/2010 | Mittet et al. |
| 2010/0061187 A1 | 3/2010 | Sodal |

FOREIGN PATENT DOCUMENTS

| | | |
|---|---|---|
| EP | 1163540 | 8/2000 |
| GB | 2 378 511 A | 2/2003 |
| GB | 2 423 370 A | 8/2006 |
| WO | WO 00/13046 | 3/2000 |
| WO | WO 01/57555 A1 | 8/2001 |
| WO | WO 03/100467 A1 | 12/2003 |

OTHER PUBLICATIONS

Bruschini, Claudio, "On the Low-Frequency EMI Response of Coincident Loops Over a Conductive and Permeable Soil and Corresponding Background Reduction Schemes," *IEEE Transactions on Geoscience and Remote Sensing*, vol. 42, No. 8, pp. 1706-1719 (Aug. 2004).

Olm, Mark C., et al., "Electromagnetic Scale Model Study of the Dust Frequency Differencing Technique," *Geophysics, Seg 1981 Annual Meeting*, vol. 47, pp. 436 (Jan. 1, 1982).

* cited by examiner

METHOD FOR ENHANCED SUBSURFACE ELECTROMAGNETIC SENSITIVITY

RELATED APPLICATIONS

The present application is a National Phase entry of PCT Application No. PCT/GB2009/002199, filed Sep. 15, 2009, which claims priority from Great Britain Application Number 0818075.4, filed Oct. 2, 2008, the disclosures of which are hereby incorporated by reference herein in their entirety.

TECHNICAL FIELD

The present invention is concerned with subsurface electromagnetic data acquisition and processing. In particular, the invention relates to a method for measuring an enhanced electromagnetic field response, especially in a submarine environment.

BACKGROUND ART

There are a number of applications of electromagnetic fields which are used in a submarine environment. Marine electromagnetic operation is an important tool for locating off-shore hydrocarbon reserves or for determining the content of a previously located reservoir. It may also be used for monitoring hydrocarbon production for reservoir management once a well bore has been drilled and oil is being extracted. One known procedure involves the use of an electromagnetic source and one or more receivers as described in the present applicants' WO01/57555. Electromagnetic energy generated by the source propagates in all directions and that which propagates downwards react with subsurface layers and the signal returns to the seafloor where it is detected by the receiver. At short offsets there will be direct waves and reflected waves dominating the signal and at longer offsets the signal can be dominated by partially guided waves.

A typical CSEM data set is characterized by large attenuation of the propagated signal. This attenuation is dominated by the distance the signal has propagated. Therefore, at larger offsets or where the target is buried more deeply, the size of the signal received may be small and it may be difficult to interpret the results to determine whether or not a reservoir of interest is present. Similarly, when monitoring an existing reservoir to determine the relative content of oil compared to water, the size of the signal may be small and again interpretation of the results may be difficult.

SUMMARY OF THE INVENTION

It is therefore an object of the present invention to provide a method of acquisition and processing an EM field with enhanced sensitivity.

According to embodiments of the invention, a method of determining the nature of strata beneath the seabed comprises applying an electromagnetic field to a strata at two or more different frequencies, detecting an electromagnetic field response at each frequency, processing the field by resolving the field responses at the different frequencies, producing differences by subtracting responses at different frequencies, and analyzing these differences in their phase and/or amplitude and thereby deriving the nature of the strata.

In one embodiment, an electromagnetic field is applied at two frequencies $f_1$ and $f_2$ where the difference between the frequencies is $\Delta\omega$. The responses at each frequency are measured and resolved and the differences in the measured responses at the different frequencies are analyzed to derive the nature of the strata. In another embodiment, multiple frequencies are applied $f_1, f_2, f_3, \ldots, f_n$ and the results at one or more pairs of any two frequencies may be selected, processed and analyzed to obtain the maximum enhancement to the sensitivity of the method.

The EM field may be applied by means of a transmitter located at or near the seabed, and the field response may be detected by means of one or more receivers located at or near the seabed. Alternatively, the EM field may be applied by means of a transmitter located in a borehole, and the field response may be detected by means of one or more receivers located at or near the seabed or located in a borehole.

The transmitter and/or receivers may be dipole antennae, for example horizontal dipole antennae, although other forms of transmitters and receivers can be used. The EM field may be applied for a time in the range 3 seconds to 60 minutes at each nominal transmission position.

The EM field may be transmitted at two or more frequencies between 0.01 and 50 Hz, or between 0.02 and 20 Hz, or between 0.03 and 10 Hz or between 0.05 and 1 Hz. The field may be transmitted at two or more frequencies substantially simultaneously or closely sequentially, or they may be transmitted at separate times. The difference between the frequencies may be in the range 0.005 to 5 Hz, or 0.01 to 1 Hz, or 0.01 to 0.1 Hz.

The method may be equally applied to magnetic as well as electric field measurements, which may be taken using known magnetic receivers. Still further, the method may be applied to both electric and magnetic measurements recorded at the same time on integrated measuring instruments which record both magnetic and electric fields, for example using magnetotelluric instruments.

While the description in this specification mentions the sea and sea bed, it is to be understood that these terms are intended to include inland marine systems such as lakes, river deltas etc.

The invention extends to the use of a method of monitoring a reservoir via a borehole which comprises applying an electromagnetic field to the reservoir at two or more different frequencies, detecting an electromagnetic field response at each frequency, processing the field by resolving the field responses at the different frequencies, producing differences by subtracting responses at different frequencies, and analyzing these differences in their phase and/or amplitude and thereby determining the hydrocarbon content of the reservoir.

In this case, one or more receivers may be placed in a borehole or an emitting antenna may be placed in a borehole with receivers at or near the sea bed, or both receivers and the emitting antenna may be in boreholes (either the same well or in different wells). This method can be used to determine the content of a reservoir and may be particularly applicable to the well as it gets older and the oil is removed and water replaces the oil in the reservoir. The smaller signal detected at each receiver as the oil content decreases is enhanced by use of the present invention.

The invention may be carried into practice in various ways and one approach to the resolution of the field will now be described in detail, by way of example, in order to illustrate the enhancement to the sensitivity of the results.

There are a number of methods for analyzing data in both the time and the frequency domain. An example of a processing and analytical technique may be found in the present applicants' WO03/100467 where the signal is resolved into upwards and downwards components at the seafloor. In the present invention the results are processed in a different way. Consider the signal propagation of two frequencies which are of a similar magnitude but differ slightly. The difference between the two received signals is given by their differences in phase and amplitude. Compared to the magnitude of the single frequency signal this difference in measured responses will typically increase as a function of the propagation distance from the electromagnetic source. This may be represented as a quantity similar to the absolute value of $$D(E, \omega, \Delta\omega) = \frac{E(\omega + \Delta\omega) - E(\omega)}{0.5(|E(\omega + \Delta\omega)| + |E(\omega)|)} \quad (1)$$

where D is the difference in response, E is a measured spatial component (a complex number with a corresponding phase and amplitude) of the electromagnetic field, ω is angular frequency, and Δω is the difference in angular frequency. The value of D will generally increase with the propagation distance up to the point in which one of the two different frequency components will dominate.

Therefore, at larger distances from the source, the difference between the two frequency components will be relatively more sensitive to subsurface structures than the individual frequency components themselves. Thus, comparing differences in response of nearby frequency components can reveal subsurface structures which may be difficult to detect when comparing single frequencies.

Differences, such as that set out in equation (1) above, can only be used if each frequency component being compared is normalized with respect to source amplitude and phase (i.e. having similar source strength and phase). Then any differences in response can be ascribed directly to the response from the subsurface rather than to any differences in the applied source.

To link quantities defined in similar ways as in equation (1) to transient impulse responses, an approximation for the derivative of the electric field with respect to the angular frequency ω may be given by equation (2) below.

$$\partial_\omega E(\omega) \approx (E(\omega + \Delta\omega) - E(\omega))/\Delta\omega \quad (2)$$

From equation (2) it can be seen that the difference in frequency response is very similar to multiplying a time series impulse response (transient measurement) with time, t as shown in equation (3) below:

$$\partial_\omega E(\omega) = -i \int_0^\infty e^{-i\omega t} t E(t) \, dt \quad (3)$$

From equation (3) it can be seen that an enhanced subsurface sensitivity may be obtained by using, for instance, different powers of t. This would correspond to derivatives with respect to the angular frequency of different orders:

$$\partial_\omega^n E(\omega) = \int_0^\infty e^{-i\omega t} (-it)^n E(t) \, dt \quad (4)$$

Hence, higher order frequency differences can also be applied to analyze the subsurface. In operation, it is important that the positions and orientations of the source and the receiver or receivers are similar for the two different frequency components used in equation (1), otherwise the difference in response from the two frequencies may be caused by different conditions in the nearby environment or difference in acquisition parameters which can not be compensated for rather than as a measure of what has been detected below the sea floor.

In a first embodiment, a single source simultaneously emits the two or more frequencies used in the method of the present invention. In an alternative embodiment, a single source is employed emitting a signal at a first frequency and measurements are taken. The same source is then redeployed as many times as necessary in the same place or along the same path with sufficient accuracy to again put into effect the method of the present invention by emitting a signal at a second or further frequency. What is important is that any uncertainty introduced by differences in source and receiver configuration is smaller than the differences caused by using different frequencies.

To measure the sensitivity of the signals received, the relative difference may be defined as:

$$R(F, F^0) = \frac{|F - F^0|}{0.5(|F^0| + |F|)} \quad (5)$$

where F is a measured or derived quantity for a given scenario compared with a reference value $F^0$. The reference value may, for example, be a background or ambient value or it may be a synthetic value calculated for the region of interest.

To utilize the current phenomenon for numerical inversion of the subsurface electromagnetic properties one can minimize the misfits between synthetic ("synth") and real data ("obs") weighted with their estimated uncertainties. For instance, one can minimize the value ε in equation (6) below:

$$\varepsilon = \frac{|F^{obs} - F^{synth}|^2}{|\Delta F|^2} \quad (6)$$

where $F=E(\omega+\Delta\omega)-E(\omega)$ and $|\Delta F|$ is the estimated uncertainty of F.

F could also be higher order differences. Such differences can approximate higher order derivatives, e.g. $F=E(\omega+\Delta\omega)+E(\omega-\Delta\omega)-2E(\omega)$, or they could be better approximations for derivatives of lower order, e.g.

$F=1.125(E(\omega+0.5\Delta\omega)-E(\omega-0.5\Delta\omega))-0.04167(E(\omega+1.5\Delta\omega)-E(\omega-1.5\Delta\omega))$ which is a second order approximation to the first order derivative. This may be expressed generically as $$F=a(E(f_1)-E(f_2))+b(E(f_3)-E(f_4))+ \ldots +n(E(f_m)-E(f_{m+1})) \quad (7)$$

where a, b, . . . , n are constants and $f_1$, $f_2$, $f_3$, $f_4$, . . . , $f_m$ and $f_{m+1}$, are frequencies where the difference between adjacent frequencies may be the same or may be different. It should be noted here that the estimated uncertainty is proportional to the derived quantity if its constituents are acquired under the same conditions (i.e. at the same positions and with the same sensor).

EXAMPLE

The present invention is further exemplified with the following example with reference to the figures.

The invention is exemplified by an example from 1D modelling. A model is created consisting of 50 m of water with a resistivity of 0.3 Ωm, followed by a 100 m layer of resistivity 1 Ωm, a 2.0 km layer of resistivity 3.0 Ωm, a 1.5 km layer of resistivity 2.0 Ωm, a 50 m layer of resistivity 30 Ωm, and finally a half space of resistivity 2.5 Ωm. This model with a resistive layer is compared with a model where the 30 Ωm layer is replaced with a 2.0 Ωm layer. The model was run with a point source at 1 Am and at frequencies ranging from 0.02 to 0.75 Hz as shown in the legend on the figures.

Figure 1:
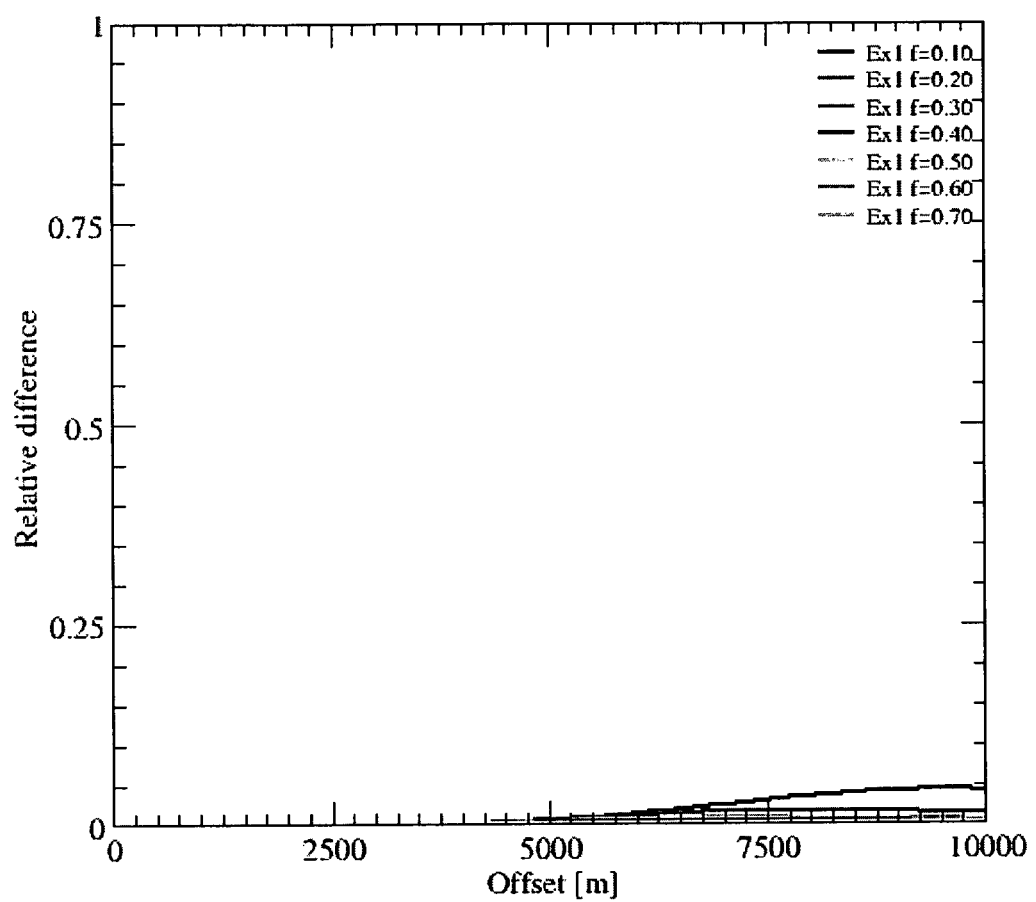
FIG. 1 shows the relationship between the measured signal and offset at different frequencies for a first model with a resistive layer compared to a model without a resistive layer.

FIG. 1 shows the relative difference of the electric fields as they are recorded without any processing, i.e. with $F=E(\omega)$ in equation (5). The frequency was varied from 0.10 to 0.70 Hz and responses were measured up to 10 km. As will be seen from FIG. 1, the more resistive reservoir is difficult to detect at any of the operating frequencies.

Figure 2:
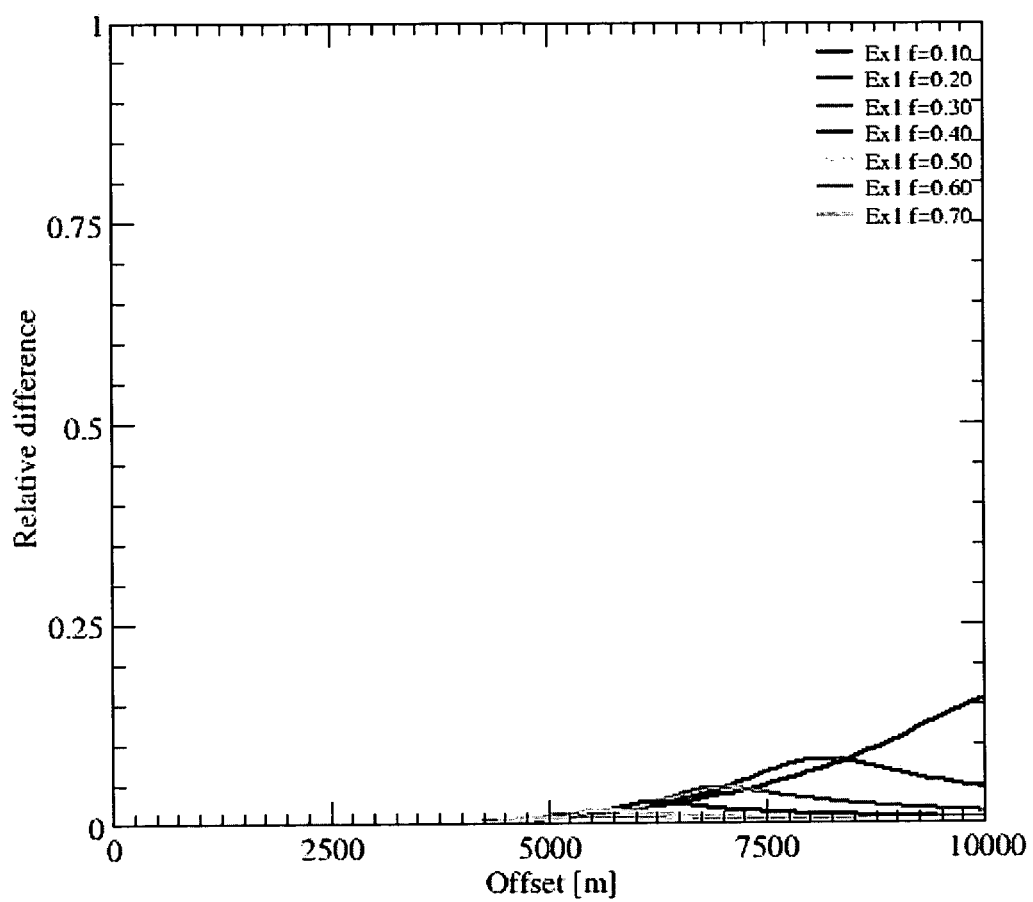
FIG. 2 shows the relationship between the measured signal processed according to the method set out in WO03/100467 and offset at different frequencies for the same two models as used in FIG. 1.

FIG. 2 shows the responses after they have been processed according to the method of WO03/100467 in which the field is resolved into upgoing and downgoing components. The downgoing components represent reflections from the seasurface and can therefore be ignored for the purposes of investigating the subterranean structure. The upgoing components represent reflections and refractions from subterranean strata and it is these which are plotted in FIG. 2. There is some differentiation of the responses but it is still difficult to interpret these to determine the presence or absence of the high resistivity layer.

Figure 3:
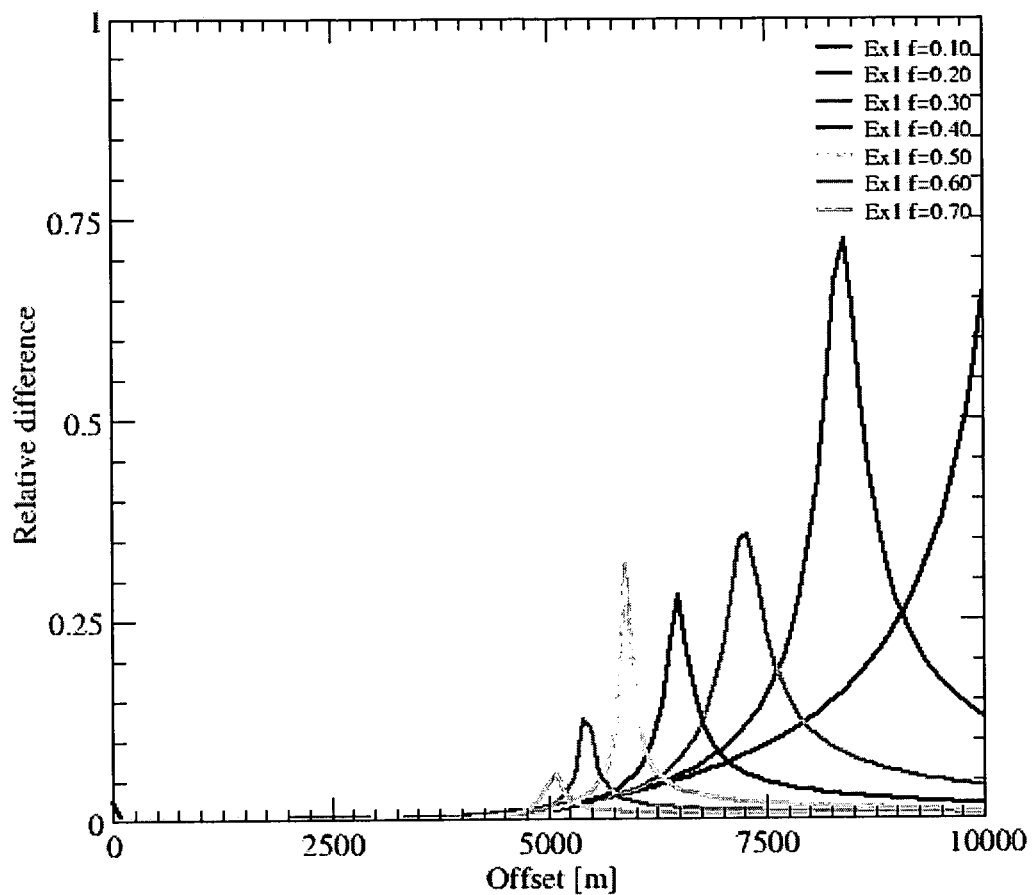
FIG. 3 shows the relationship between the measured signal processed according to the present invention and offset at different frequencies for the same two models as used in FIGS. 1 and 2.

FIG. 3 shows the responses after they have been processed according to the present invention, such that $F=E(\omega+\Delta\omega)-E(\omega)$ in equation (5) above. A noise-floor of $10^{-15}$ V/m has been added to the difference data. As can be seen from FIG. 3, the data differences are higher than the overall noise floor of the recording instrument and the natural environment and so can be analyzed with confidence. As the offset increases, the data differences reach the noise floor level and the response suddenly drops. The data for this example was obtained using a single source emitting two frequencies simultaneously and with a difference in frequency of 0.05 Hz. The second frequency was 0.05 Hz above the frequency value quoted in the table, although it could equally have been below. As can clearly be seen from FIG. 3, plotting the difference in response of two frequencies produces curves which have much greater sensitivity to the high resistive layer and the data can interpreted with greater certainty to determine whether or not there is a highly resistive layer in the subsurface or not.

Figure 4:
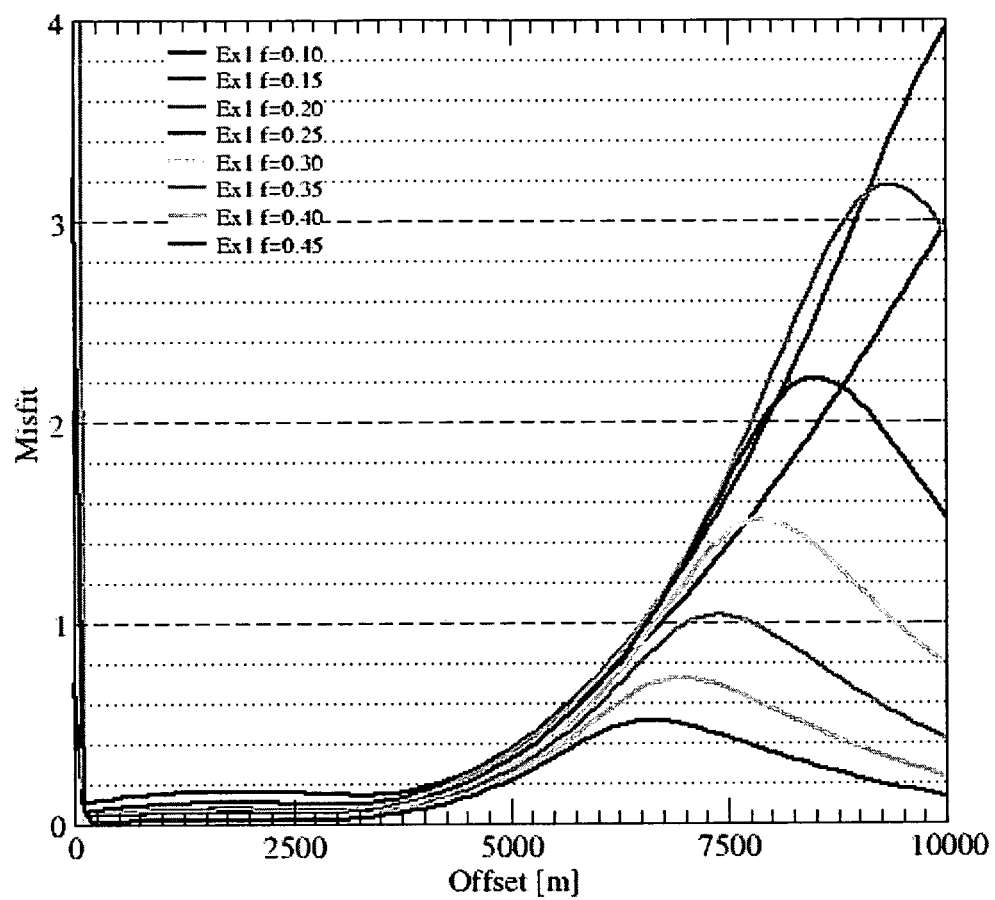
FIGS. 4 and 5 show the square root of the misfit function as defined in equation (6) for the models used in FIGS. 1-3.
Figure 5:
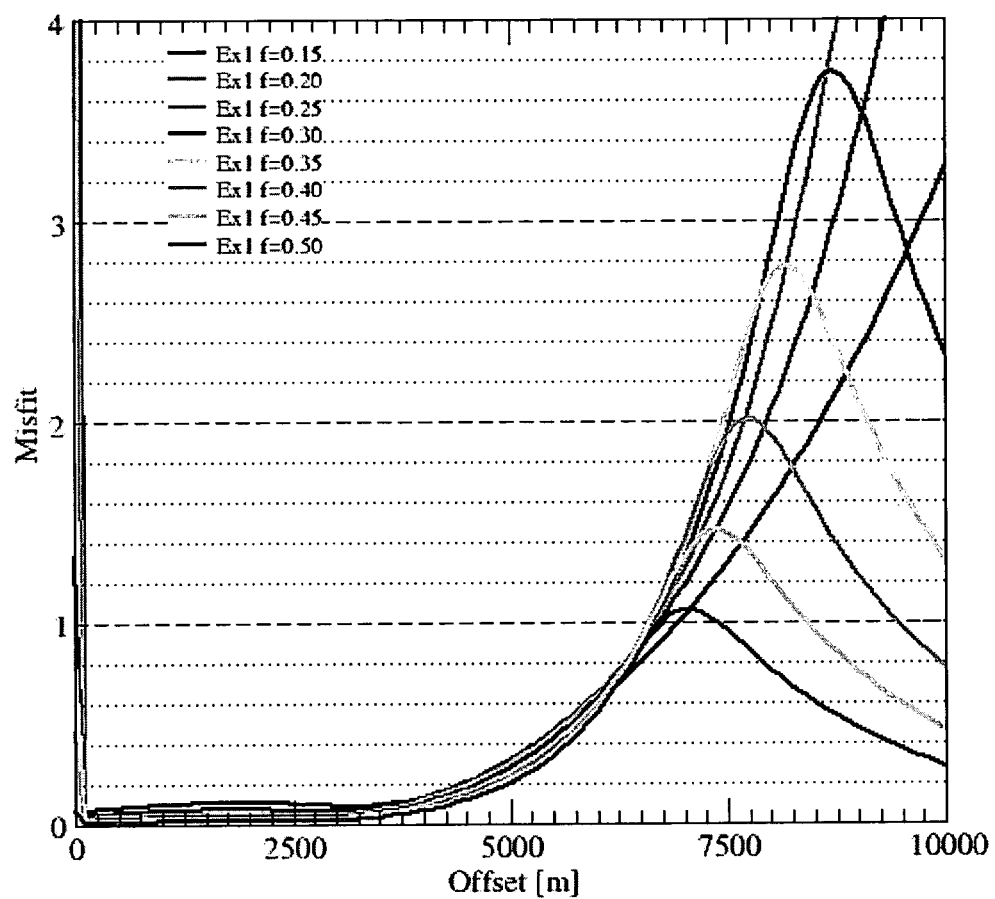

FIGS. 4 and 5 show the square root of the misfit functions as defined in equation (6) for the same models as above. Here, a second order difference was used, i.e. with $F=E(\omega+\Delta\omega)+E(\omega-\Delta\omega)-2E(\omega)$. In FIG. 4 the three frequencies used to create the second order difference had a separation of 0.05 Hz. In FIG. 5 this separation has been increased to 0.1 Hz. The figures show that by increasing the frequency difference one can obtain larger differences and thereby increase the signal to noise ratio.

The differences are at their clearest when they are numerical approximations to derivatives with respect to frequency. This means that you can have "any" separation between two frequency components as long as you scale their difference with the inverse of the frequency separation. One example could be: $f_1=0.1$, $f_2=0.15$ and $f_3=0.25$ and the second order difference could be $$F=E(f_1)-E(f_2)-0.5(E(f_2)-E(f_3)).$$

Figure 6:
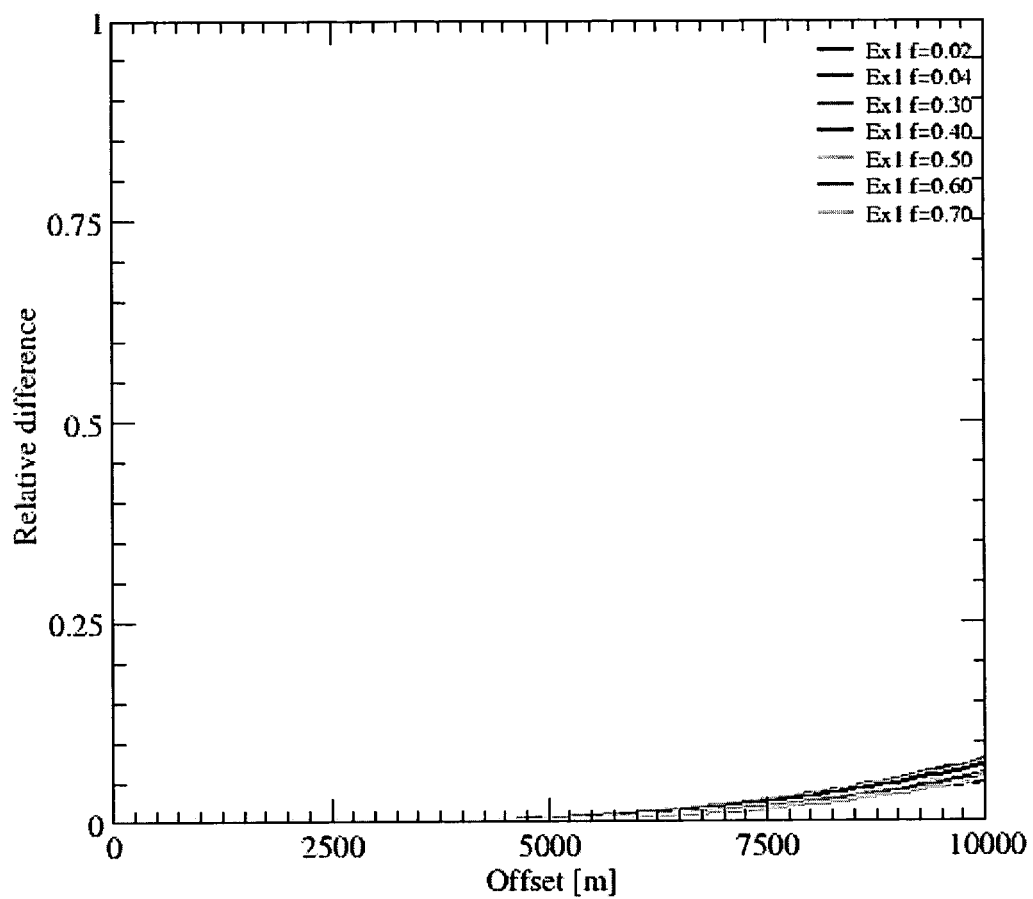
FIGS. 6 to 8 correspond to FIGS. 1 to 3 for a second model again compared to a model without a resistive layer.
Figure 7:
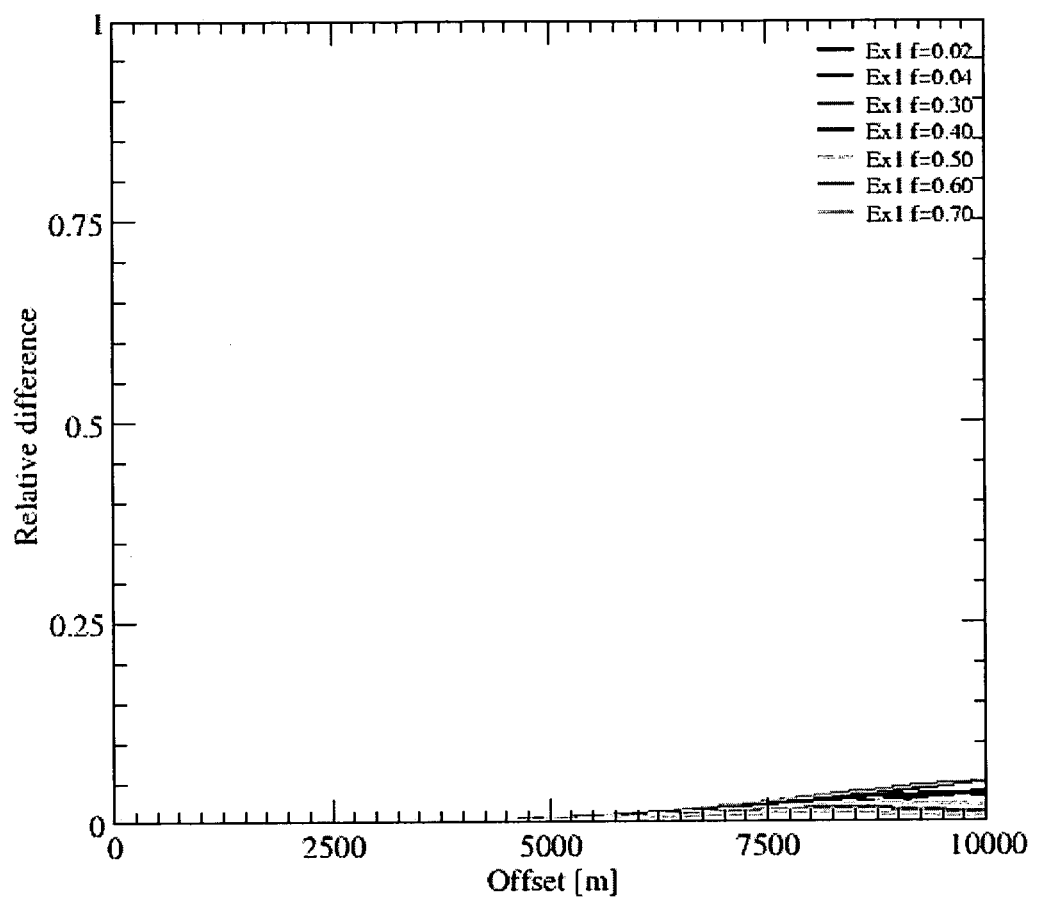
Figure 8:
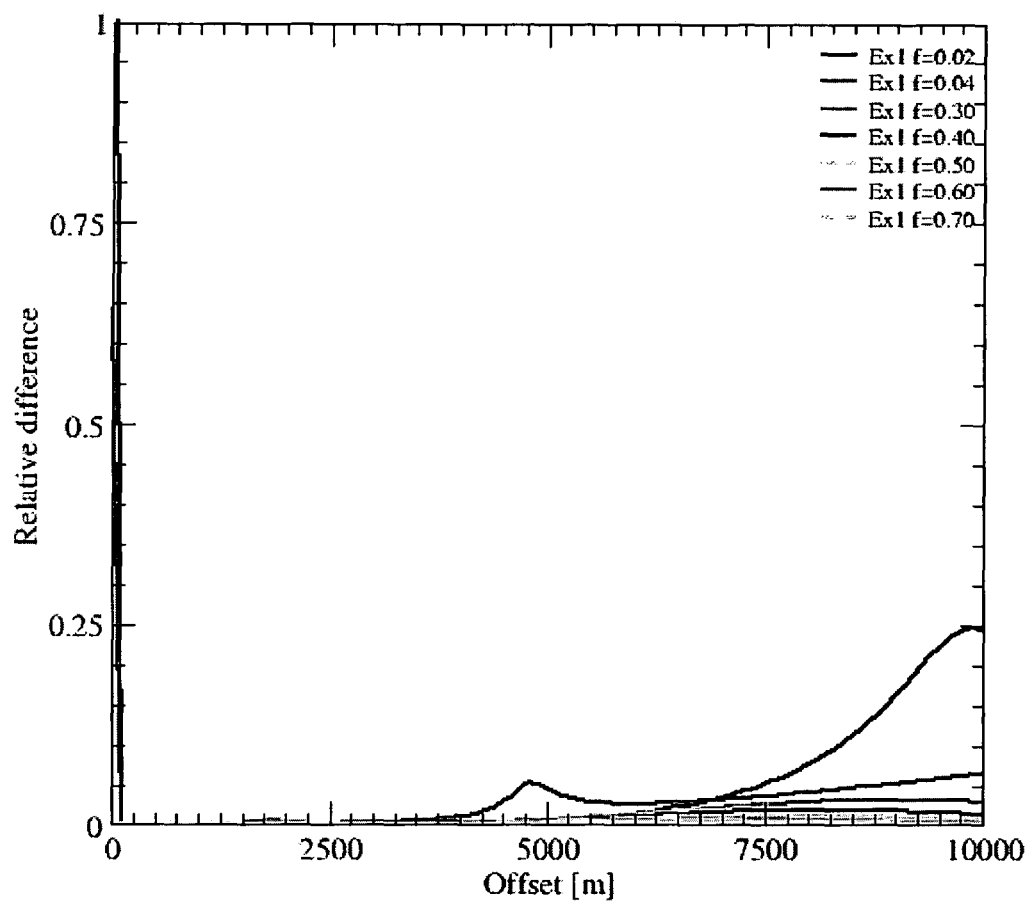

FIGS. 6 to 8 show the same three respective graphs as FIGS. 1 to 3 but for a model with 3.0 km of water rather than 50 m. This shows the applicability of the method to deep water as well as to shallow water environments. A similar tendency can be observed but at lower frequencies (~0.03 Hz) than for the shallow water case and with weaker response. However, the plot for the responses processed according to the present invention (FIG. 8) are still much stronger than those for the single frequency result either plotted naturally (FIG. 6) or when separated into upwards and downwards components (FIG. 7). In this case the difference ($\Delta\omega$) between the frequencies in the results plotted in FIG. 8 was 0.01 Hz for the lowest frequencies. Generally, the frequency difference ($\Delta\omega$) scales with the frequencies which are being investigated, i.e. at smaller applied frequencies, ($\Delta\omega$) is smaller too in order to obtain the difference.

In addition to the sensitivity of the data being enhanced, a further benefit over the method of WO03/100467, which is already an improvement on the results of the data without processing, is that the method of the present invention does not depend on having access to both electric and magnetic fields but can operate on each alone. For very shallow waters, it appears that the electric fields alone give the best sensitivity whereas in intermediate water depths the magnetic field alone appears to be better. In deep waters the electric field appears to be better when a second or higher order difference is applied such as that shown in FIGS. 4 and 5.

The invention claimed is:

1. A method of determining a nature of strata beneath a seabed comprising:
   applying an electromagnetic field by a transmitter to the strata at two or more different frequencies;
   detecting by a receiver an electromagnetic field response at each frequency;
   processing the field by resolving the field responses at the different frequencies;
   producing differences by subtracting responses at different frequencies, where the difference between each of the two or more frequencies is in the range 0.005 to 5.0 Hz; and
   analyzing these differences in their phase and/or amplitude and thereby deriving the nature of the strata, where the method can be applied to magnetic as well as electric field measurements.

2. A method as claimed in claim 1, wherein the responses at the two or more frequencies are processed according to a first order difference.

3. A method as claimed in claim 1, wherein the responses at the two or more frequencies are processed according to a second or higher order response.

4. A method as claimed in claim 3, wherein the responses are processed according to the formula:

$$F=a(E(f_1)-E(f_2))+b(E(f_3)-E(f_4))+\ldots+n(E(f_m)-E(f_{m+1}))$$

where F is a measured or derived quantity for a given scenario, E is a measured spatial component of the electromagnetic field, a, b, ..., n are constants and $f_1$, $f_2$, $f_3$, $f_4$, ..., $f_m$ and $f_{m+1}$ are frequencies.

5. A method as claimed in claim 1, wherein the electromagnetic field is transmitted at frequencies between 0.01 and 50 Hz.

6. A method as claimed in claim 5, wherein the electromagnetic field is transmitted at frequencies between 0.02 and 20 Hz.

7. A method as claimed in claim 6, wherein the electromagnetic field is transmitted at frequencies between 0.05 and 1 Hz.

8. A method as claimed in claim 1, wherein the two or more frequencies are transmitted simultaneously.

9. A method as claimed in claim 1, wherein the two or more frequencies are transmitted sequentially.

10. A method as claimed in claim 1, wherein the difference between each of the two or more frequencies is in the range 0.01 to 1 Hz.

11. A method as claimed in claim 10, wherein the difference between each of the two or more frequencies is in the range 0.01 to 0.1 Hz.

12. A method as claimed in claim 1, wherein the transmitter is located at or near the seabed.

13. A method as claimed in claim 1, wherein the transmitter is located in a borehole.

14. A method as claimed in claim 1, wherein the transmitter is a dipole antenna.

15. A method as claimed in claim 14, wherein the transmitter is a horizontal dipole antenna.

16. A method as claimed in claim 1, wherein the receiver comprises one or more receivers located at or near the seabed.

17. A method as claimed in claim 1, wherein the receiver is one of a plurality of receivers arranged over an area of the seabed.

18. A method as claimed in claim 17, wherein the receivers are arranged in a line.

19. A method as claimed in claim 17, wherein data from an array of the receivers is used to resolve the field.

20. A method as claimed in claim 17, wherein data from each receiver independently is used to resolve the field.

21. A method as claimed in claim 1, wherein the receiver comprises one or more receivers located in a borehole.

22. A method as claimed in claim 1, wherein the receiver is a dipole antenna.

23. A method as claimed in claim 22, wherein the dipole antenna is a horizontal dipole antenna.

24. A method as claimed in claim 1, wherein just the magnetic field response is measured at each frequency, and just the magnetic field is processed.

25. A method as claimed in claim 1, wherein just the electric field is measured at each frequency, and just the electric field is processed.

26. A method as claimed in claims 1, wherein both the electric and magnetic fields are measured and both are processed.

27. A method of monitoring a reservoir via a borehole comprising:
   applying an electromagnetic field by a transmitter to the reservoir at two or more different frequencies;
   detecting by a receiver an electromagnetic field response at each frequency;
   processing the field by resolving the field responses at the different frequencies;
   producing differences by subtracting responses at different frequencies, where the difference between each of the two or more frequencies is in the range 0.005 to 5.0 Hz; and
   analyzing these differences in their phase and/or amplitude and thereby determining the hydrocarbon content of the reservoir, where the method can be applied to magnetic as well as electric field measurements.

* * * * *